Nov. 9, 1926.

C. A. BAKER 1,606,462

SHAFT PACKING

Filed Sept. 11, 1925

Inventor:
C. A. Baker,
By David O. Bonnell,
Attorney

Patented Nov. 9, 1926.

1,606,462

UNITED STATES PATENT OFFICE.

CHESTER A. BAKER, OF OMAHA, NEBRASKA, ASSIGNOR TO BAKER ICE MACHINE COMPANY, OF OMAHA, NEBRASKA, A CORPORATION OF NEBRASKA.

SHAFT PACKING.

Application filed September 11, 1925. Serial No. 55,760.

My invention relates to packing for use about rotating shafts. It is the general object of my invention to provide a packing of this class, especially adapted for use on the crankshafts of compressors for ammonia and the like, wherein the suction or intake of the compressor is connected with the crank-case, so that at times the crank-case may contain elastic fluid under considerable pressure, and at other times the crank-case pressure may be less than atmospheric. A further object of my invention is to provide a packing of this class in which the wearing surfaces of the packing, which contact with the rotating shaft, are formed entirely of soft metal, whereby abrasion or scoring of the shaft is avoided. A further object is to provide a packing of this class which will not loosen to permit leakage, nor tighten to cause excessive friction, by reason of expansion or contraction of the parts due to changes of temperature, such as occur when a compressor is operated intermittently or upon greatly varying loads. A further object of my invention is to provide in a packing of this class means for maintaining efficient lubrication between the contacting surfaces of the packing and the shaft. More particular objects of my invention will appear hereinafter.

Figure 1:
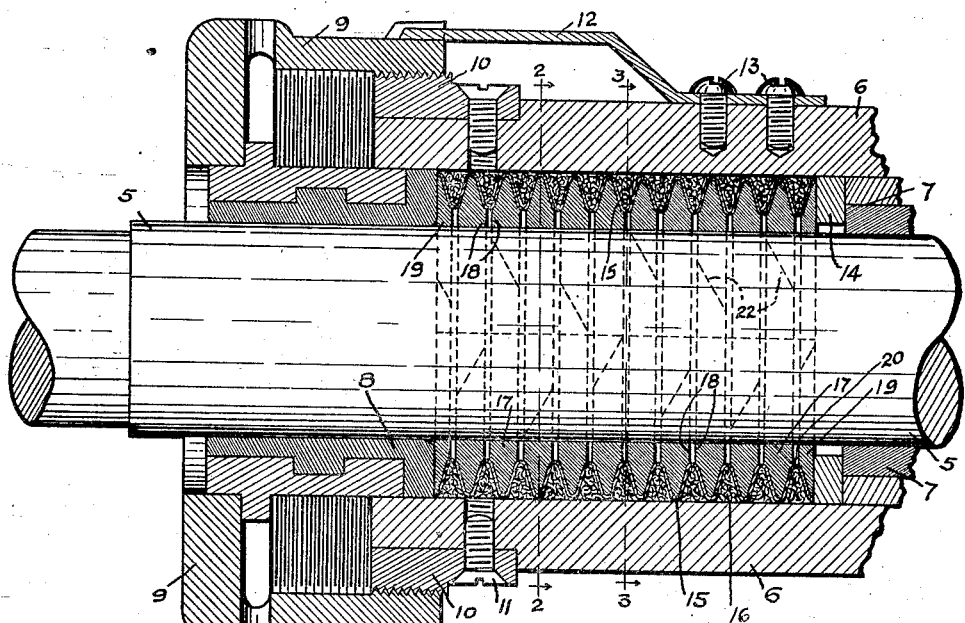
Figure 2:
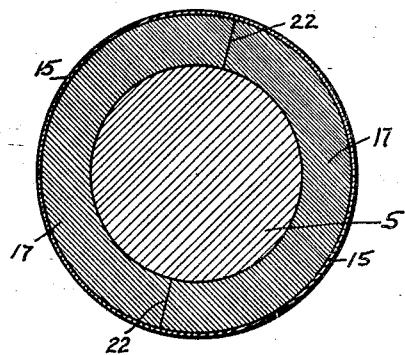
Figure 3:
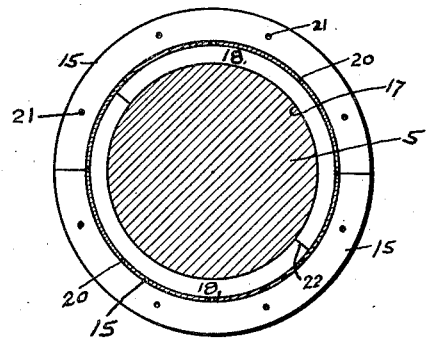

In the accompanying drawings Fig. 1 is a longitudinal section of a shaft packing embodying my invention, Fig. 2 is a transverse section of the packing and shaft, on the plane of the line 2—2 of Fig. 1, and Fig. 3 is a similar section on the line 3—3 of Fig. 1, the fibrous packing material being removed.

In the structure illustrated in Fig. 1 the packing is disposed about a shaft 5, which may be the crank-shaft of a compressor, and the housing or inclosing member 6 which surrounds the packing may be a portion of the crank-case of the compressor. The packing-space or stuffing-box is formed between an inner bearing 7 for the shaft, and an outer bearing 8, the latter extending slidably into the stuffing-box and its position being controlled by a gland 9 which is screwed onto a threaded ring 10 secured on a shoulder at the end of the housing member 6 by means of screws 11. The gland is retained at adjusted positions by means of a spring 12 secured to the member 6 by means of screws 13, the free end of said spring entering notches formed in a flange at the end of the gland. A stop-ring 14 is arranged at the inner end of the stuffing-box adjoining the bearing 7.

It will be understood that the above mentioned parts are illustrated merely as suitable accessories for the packing, and that the latter may be used in any stuffing-box which is adapted to confine the packing radially of the shaft and which has means for variably limiting the longitudinal space to which the packing is confined.

In the packing constructed according to my invention I provide a corrugated tube 15 of thin flexible metal, of the general type sometimes employed as a metal bellows in pressure-controlled valves. The corrugated tube is of such length relative to the pitch of the corrugations as to have a plurality of annular grooves internally and externally thereof, said grooves being approximately triangular in section on a plane extending radially of the tube. The inside diameter of the tube is materially greater than the diameter of the shaft on which the packing is to be used, and the outside diameter of the tube is preferably such that it will fit loosely within the stuffing-box, but without excessive clearance outside the crests of the corrugations. The external annular grooves of the corrugated tube are filled with rings of fibrous packing material which may be non-metallic, said packing material being saturated with oil so that its interstices are substantially filled with lubricant. The internal grooves of the corrugated tube are filled with packing-rings 17 of soft metal, the outer portions of said rings being shaped to fit the tube, and the inner portions of the rings being substantially rectangular in radial section, so that adjacent to the bore thereof which fits upon the shaft the rings have flat annular end-faces 18 extending perpendicularly to the axis of the shaft, and said flat end-faces are slightly spaced apart longitudinally of the shaft. In the illustrated structure, the end-rings 19, which adjoin the outer or gland-bearing 8 and the stop-ring 14 at the inner end of the stuffing-box, are of half the thickness of the intervening rings 17, whereby the packing as a whole presents flat end-faces perpendicular to the rod. A plurality of small openings or perforations 20 are formed in the corrugated tube at the bottoms of the external annular grooves which contain the fibrous packing material 16, the said openings 20 communicating with the open spaces adjoining the shaft and between the end-faces 18 of the rings 17. Perforations 21 may also be made in the sloping sides of the grooves, as indicated in Fig. 3.

When the packing is used upon a shaft which is unobstructed from the end thereof to the stuffing-box, or when a fly-wheel, pulley or the like carried upon the protruding portion of the shaft may be easily removed to afford access to the stuffing-box, the packing-rings 17 may be integral or continuous circumferentially. When the fly-wheel or the like carried upon the external portion of the shaft cannot be readily removed, or for any reason the packing-rings cannot be slipped over the shaft from the end thereof, the rings may be divided into two segments, whereby to enable the assembly thereof from the sides only of the shaft. When the rings are so divided into segments, the abutting ends 22 are preferably inclined axially, and the joints of the several rings are disposed in staggered or un-alined relation longitudinally, as indicated by the dotted lines in Fig. 1. To facilitate the assembly of the packing the corrugated tube 15 may also be divided longitudinally on a plane intersecting the longitudinal axis of the tube. When the tube is so divided, the longitudinal joints thereof are formed by the closely abutting edges of the two halves of the tube, so that said joints are tight throughout their length.

When the packing is used for ammonia compressors, the packing-rings and corrugated tube must be of materials which are not corrosible by the ammonia. For this purpose the tube may be of steel, and the rings 17 may be of lead. It is essential in all cases that the packing-rings be of a relatively soft metal, so as to be capable of upsetting under moderate pressure. It is desirable also that the corrugated tube be of metal having such resilience as to tend to resume its normal formation after deformation by longitudinal compression or by extension of its length.

When the described packing is confined within the stuffing-box and is compressed longitudinally by adjustment of the gland to force the gland-bearing 8 inwardly, such longitudinal compression of the corrugated tube causes the sides of the annular grooves to approach each other, the angular relation of said sides becoming more acute as the pitch or distance from center to center of the corrugations becomes less. The packing-rings 17 are thereby pressed inward radially of the shaft, the inward pressure being uniform throughout the circumference of each ring, and the rings being thereby upset to conform closely at the bore thereof with the shaft. The packing material 16 in the external grooves of the tube is similarly pressed radially outward, and thus caused to conform with the bore of the stuffing-box. The pressure upon the packing material 16 also tends to cause portions of the lubricant therefrom to be forced through the openings 20 of the corrugated tube, into the annular spaces between the end-faces 18 of the packing-rings. The packing as a whole thus contains a plurality of annular lubricant-channels, interspaced with the several packing-rings, and efficient lubrication may thus be maintained about the shaft throughout the length of the packing. Some portions of the lubricant may also pass through the openings 21, and serve to reduce the frictional adhesion between the rings 17 and the inner surfaces of the corrugated tube.

When the longitudinal pressure upon the packing is reduced or removed, the resilience of the corrugated tube causes it to slightly elongate, and thereby tends to loosen the packing so that its removal from the stuffing-box is facilitated. It will be seen that the packing is equally effective in preventing leakage about the shaft in either direction, and it is found in practice that the tightness of the packing is substantially unchanged throughout the usual range of temperature variations to which it is subject when used for compressors. By the use of metallic packing-rings for contact with the moving shaft, and the fibrous lubricant-holding packing material as a resilient backing or filler about the metallic rings, the principal advantages of both metallic and soft or non-metallic packing are attained.

Now, having described my invention, what I claim and desire to secure by Letters Patent is:

1. A shaft packing comprising an annularly corrugated metal tube, a plurality of packing-rings of soft metal fitting within the internal annular grooves of said tube, the bore of the rings being adapted for engaging the shaft, and the adjacent end-faces of the rings being spaced apart longitudinally, rings of fibrous packing material disposed in the external annular grooves of the corrugated tube, and means for confining the packing laterally and for compressing the same longitudinally of the shaft.

2. In a shaft packing, a longitudinally resilient circumferentially corrugated metal tube, fibrous packing material disposed in the external annular grooves of said tube, soft metal packing-rings disposed in the internal annular grooves of said tube, said packing-rings being spaced apart longitudinally, the fibrous packing material being saturated with a lubricant, and there being openings through the corrugated tube from the external grooves to the spaces between the packing-rings.

CHESTER A. BAKER.